US008111437B2

(12) United States Patent
Muramatsu

(10) Patent No.: US 8,111,437 B2
(45) Date of Patent: Feb. 7, 2012

(54) IMAGE PROCESSING DEVICE, IMAGE PROCESSING METHOD, AND PROGRAM FOR PERFORMING DIRECT PRINTING WHICH CONSIDERS COLOR MATCHING PROCESSING BASED ON A PROFILE DESCRIBING THE INPUT COLOR CHARACTERISTICS OF AN IMAGE DEVICE AND THE OUTPUT COLOR CHARACTERISTICS OF AN IMAGE OUTPUT DEVICE

(75) Inventor: Mizuki Muramatsu, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1180 days.

(21) Appl. No.: 11/265,992

(22) Filed: Nov. 3, 2005

(65) Prior Publication Data
US 2006/0092445 A1 May 4, 2006

(30) Foreign Application Priority Data

Nov. 4, 2004 (JP) ................. 2004-321128

(51) Int. Cl.
H04N 1/60 (2006.01)
G03F 3/08 (2006.01)
(52) U.S. Cl. ........................ 358/518; 358/1.9
(58) Field of Classification Search .................. None
See application file for complete search history.

(56) References Cited

U.S. PATENT DOCUMENTS

| 6,955,486 | B2 | 10/2005 | Nishitani | |
| 2001/0028471 | A1* | 10/2001 | Hirokazu | 358/1.13 |
| 2003/0142330 | A1* | 7/2003 | Arakawa | 358/1.9 |
| 2003/0193688 | A1* | 10/2003 | Namikata | 358/1.15 |
| 2004/0046981 | A1* | 3/2004 | Taka et al. | 358/1.9 |
| 2004/0136020 | A1 | 7/2004 | Kumada | |
| 2004/0161268 | A1* | 8/2004 | Tomita et al. | 399/301 |
| 2005/0019077 | A1* | 1/2005 | Hatta et al. | 400/62 |
| 2005/0036157 | A1* | 2/2005 | Takabayashi et al. | 358/1.9 |
| 2005/0146735 | A1* | 7/2005 | Ternasky et al. | 358/1.9 |
| 2006/0181719 | A1* | 8/2006 | Aoki et al. | 358/1.9 |

FOREIGN PATENT DOCUMENTS

| JP | 2004-007415 A | 1/2004 |
| JP | 2004-152124 A | 5/2004 |
| JP | 2004-173254 A | 6/2004 |

OTHER PUBLICATIONS http://download.microsoft.com/download/1/8/f/18f8cee2-0b64-41f2-893d-a6f2295b40c8/TW04034_WINHEC2004.ppt.

* cited by examiner

Primary Examiner — King Poon
Assistant Examiner — Ming Hon
(74) Attorney, Agent, or Firm — Canon USA Inc IP Division

(57) ABSTRACT

An image processing method is provided for an image processing device which processes images of printing data input from a computer device and an image input device via a predetermined communication line or a network. Printing instruction information of the printing data is analyzed, and determination is made as to whether a request for color matching processing based on a profile describing input color characteristics of an image input device and output color characteristics of an image output device is included in the printing instruction information. In the case that a request for the color matching processing is included in the printing instruction information, color matching processing is requested to be performed by the computer device on the network.

5 Claims, 14 Drawing Sheets

FIG. 14

```
<JobTicket>
<Common:Paper="A4",Copy="1",...../>
<CMS Info>
  <ColorSpace="scRGB"/>
  <ObjectType="Image"/>
  <IntentType="Perceptual"/>
  <UseCITE="True"/>
  <DMPType="Camera"/>
  <DMPName="CamXXX.xml"/>
  <DMPType="Printer"/>
  <DMPName="PrnXXX.xml"/>
</CMS Info>
<ODM Info>
........
<HT Info>
........
</HT Info>
</JobTicket>
```

FIG. 15

```
<JobTicket>
<Common:Paper="A4",Copy="1",...../>
<CMS Info>
  <ColorSpace="scRGB"/>
  <ObjectType="Image"/>
  <IntentType="Perceptual"/>
  <UseCITE="True"/>
  <DMPType="Camera"/>
  <DMPName="CamXXX.xml"/>
  <DeviceType="Printer"/>
  <DeviceName="PrnXXX.xml"/>
</CMS Info>
<ODM Info>
........
<HT Info>
........
</HT Info>
</JobTicket>
```

FIG. 16

```
<JobTicket>
<Common:Paper="A4",Copy="1",...../>
<CMS Info>
  <ColorSpace="scRGB"/>
  <ObjectType="Image"/>
  <IntentType="Perceptual"/>
  <UseCITE="Host"/>
  <DMPType="Camera"/>
  <DMPName="CamXXX.xml"/>
  <DMPType="Printer"/>
  <DMPName="PrnXXX.xml"/>
</CMS Info>
<ODM Info>
........
<HT Info>
........
</HT Info>
</JobTicket>
```

FIG. 18

```
<JobTicket>
  <Common:Paper="A4",Copy="1",...../>
  <CMS Info>
    <ColorSpace="scRGB"/>
    <ObjectType="Image"/>
    <IntentType="Perceptual"/>
    <UseCITE="True"/>
    <DMPType="Monitor" />
    <DMPName="MonXXX.xml" />
    <DMPType="Printer" />
    <DMPName="PrnXXX.xml" />
  </CMS Info>
  <ODM Info>
  .........
  </ODM Info>
  <HT Info>
  .........
  </HT Info>
</JobTicket>
```

ND PROGRAM
IMAGE PROCESSING DEVICE, IMAGE PROCESSING METHOD, AND PROGRAM FOR PERFORMING DIRECT PRINTING WHICH CONSIDERS COLOR MATCHING PROCESSING BASED ON A PROFILE DESCRIBING THE INPUT COLOR CHARACTERISTICS OF AN IMAGE DEVICE AND THE OUTPUT COLOR CHARACTERISTICS OF AN IMAGE OUTPUT DEVICE

BACKGROUND OF THE INVENTION

1. Field of the Invention

The present invention relates to an image processing device, an image processing method, and a program, relating to color matching processing.

2. Description of the Related Art

As the use of networks in offices and so forth has increased, devices which provide network connection functionality to image forming devices such as digital photocopiers and printers have become widely used. By using such an image forming device, printing or scanning can be performed via a network.

Also, the demand has increased for color image input devices, such as digital cameras, and camera functionality is provided to mobile terminals such as portable telephones. Accordingly, demand has increased for sending photographed images directly from a color image input device to a color image output device such as a printer, for printing the photograph.

Such a direct printing system which prints an image directly from a portable color image input device will be discussed. With such a system, color matching is performed on the printer side, using an ICC (International Color Consortium) profile, in order to realize color matching between the color image input device and the printer.

A technology is proposed for performing color matching by driving a mapping model on an operating system (OS), with a file format describing measurement values of an input/output device called DMP (Device Model Profile) which uses XML (extensible Markup Language) descriptions.

The measurement values of an input device are the data showing the color value (Lab value and so forth) in which the input device has photographed a color patch, and the correlation (input color characteristics) of the color reading value of the color patch (the Lab value and so forth which the color measurement values device outputs).

The measurement values of an output device are the data showing the color value (Lab value and so forth) in which the output device has printed a color patch, and the correlation (output color characteristics) of the color measurement values of the color patch (the Lab value and so forth which the color measurement values device outputs).

FIG. 10 illustrates color matching processing using DMP, and the above-described color matching processing is realized by a module called ColorTranslationEngine (hereinafter this will be called "CTE").

In FIG. 10, the DMP (Device Model Prdfile) 4061 is data which is described in XML format, and includes color information individual to the input/output device, and color matching processing is performed with a method which is regulated by the device model 4062.

The device model 4062 performs conversion processing using a method determined by a matching method 4063 which is separated into a baseline, which is a processing common to each input and output device, and a plug-in, which is individually set by a vendor. For example, it can be determined that a CRT (cathode ray tube) such as a monitor performs 3 by 4 matrix operations, gamma correction processing, offset processing, and gain processing, and that an RGB (red-green-blue) printer performs three-dimensional LUT (lookup table) conversion.

A color gamut model (GamutMap Models) 4064 is executed by a mapping algorithm 4065 for each intent, which is separated into a baseline, which is a common process for running a mapping model which performs color conversion, and a plug-in, which is individually set by a vendor. For example, in the case of Colorimetric, brightness clip processing is performed, and so forth.

Now, a method which dynamically performs color matching based on a profile describing the measurement values of an input/output device requires far higher processor processing capabilities, compared with color matching which uses a conversion table described in an ICC profile. Accordingly, with direct printing, color matching using DMP is difficult for a printer to perform.

SUMMARY OF THE INVENTION

The present invention provides direct printing which considers color matching processing based on a profile describing the input color characteristics of an image input device and the output color characteristics of an image output device.

Also, the present invention provides relegation processing of the color matching processing based on a profile describing the input color characteristics of an image input device and/or the output color characteristics of an image output device.

According to a first aspect of the present invention, an image processing method is provided for an image processing device which processes images of printing data input from a computer device and an image input device via a predetermined communication line or a network. The method includes analyzing printing instruction information of the printing data; determining whether a request for color matching processing based on a profile describing input color characteristics of an image input device and output color characteristics of an image output device is included in the printing instruction information; and if it is determined that the request for color matching processing is included in the printing instruction information, requesting the color matching processing to the computer device on the network.

According to a second aspect of the present invention, an image processing method is provided for an information processing device which is connected to a network. The method includes receiving, from an image processing device via the network, printing instruction information which includes a request for color matching processing based on a profile; setting the profile in the printing instruction information as information set for use in color match processing; and performing color matching processing using information set for use in color match processing.

Further features of the present invention will become apparent from the following description of exemplary embodiments with reference to the attached drawings.

BRIEF DESCRIPTION OF THE DRAWINGS

FIG. 14 is a diagram illustrating an example of a job ticket in the case that there is determined to be a DMP file of a printer.

FIG. 15 is a diagram illustrating an example of a job ticket in the case that a DMP file of a printer is determined not to exist.

FIG. 16 is a diagram illustrating an example of a job ticket for relegating color matching processing with a computer.

FIG. 18 is a diagram illustrating an example of a job ticket in which a monitor DMP is set in the case that there is no DMP information of an image input device.

DESCRIPTION OF THE EMBODIMENTS

First Embodiment

Figure 1:
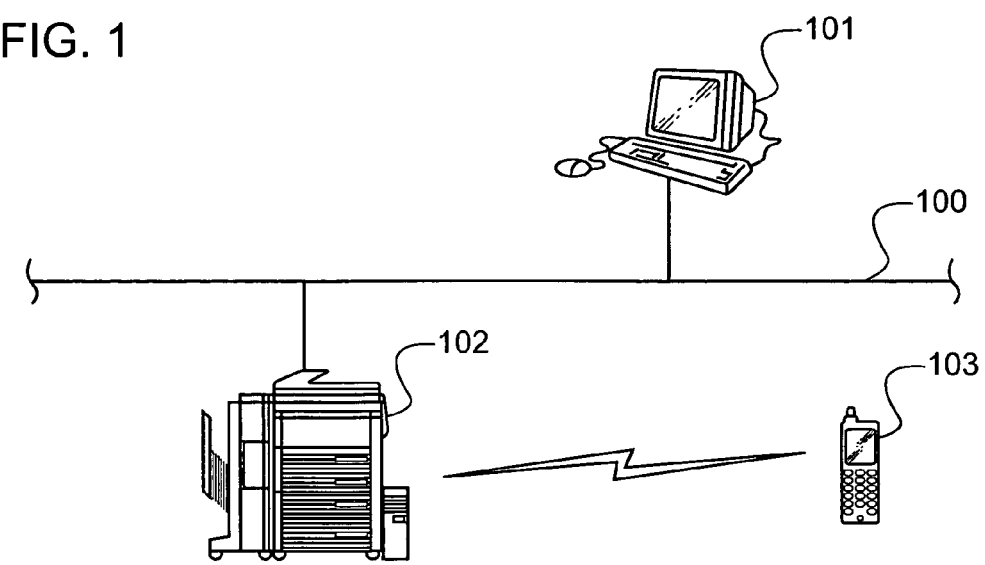
FIG. 1 is a diagram illustrating an exemplary configuration of an image processing system according to an embodiment of the present invention.

Exemplary embodiments of image processing according to the present invention will be described in detail below while referencing the attached diagrams.
Overview of Image Processing System FIG. 1 illustrates an image processing system according to an embodiment of the present invention. As illustrated in FIG. 1, the image processing system includes a computer 101 and a multifunction printer (hereinafter referred to as an "MFP") 102 which are interconnected via a network 100.

In general, an Ethernet is used for the network (hereinafter referred to as "LAN" (local area network)) 100, and performs information sending and receiving, as well as data transfer, between the various devices which are connected to the LAN 100, with a TCP/IP (Transmission Control Protocol/Internet Protocol) using a physical cable such as a 100BaseT.

The computer 101 sends printing information which is formed of drawing commands (including character printing commands, various types of shape drawing commands, image drawing commands, color specification commands, and so forth) to the MFP 102.

The MFP 102 draws character patterns, figures, images, and so forth, so as to form an image on a recording sheet which is a recording medium (printing function), according to the drawing commands of the printing information received from the computer 101 or a portable input device 103. Also the MFP 102 can form an image on the recording sheet which is read from an original document (copying function).

Figure 2:
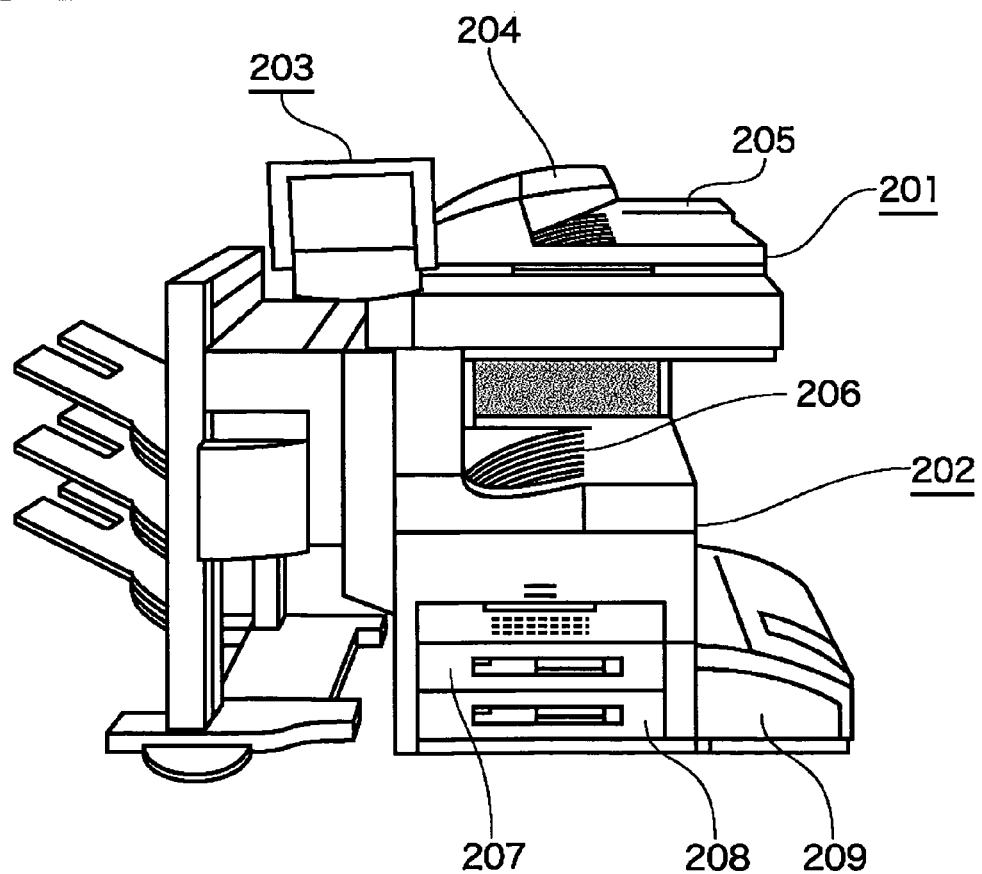
FIG. 2 is an external view of an exemplary configuration of a digital photocopier.

The portable input device 103 is a portable telephone, a digital camera, or the like, which provides a wired or wireless communication function and an image output function.
MFP Configuration FIG. 2 is an external view of an exemplary configuration of a digital photocopier, which is a specific example of the MFP 102. As illustrated in FIG. 2, the MFP 102 can be largely divided into an image reader 201 which reads an original document image, a printer 202 which prints the image read by the image reader 201, and an operating unit 203 for setting the various operations of the MFP 102.

The image reader 201 reads the original document image with a resolution of 400 dpi (dots per inch), for example, and performs digital signal processing. When the user sets the original document in a tray 204, and instructs reading of the original document image by the operating unit 203, the image reader 201 which is controlled by a controller 300 of the MFP 102 feeds the original document one sheet at a time by a feeder 205, and reads the original document image.

The operating unit 203 provides setting of various actions of the MFP 102 such as copying actions, and also provides a user interface which displays the operation status of the MFP 102.

The printer 202 prints the image corresponding to the original document image read by the image reader 201 in full color onto recording sheets with a specified resolution of 400 dpi, for example, and ejects this into a discharge tray 206. The printer 202 has multiple paper supply levels so as to select the size or direction of the recording sheet, and is provided with corresponding recording sheet cassettes 207, 208, and 209.

Figure 3:
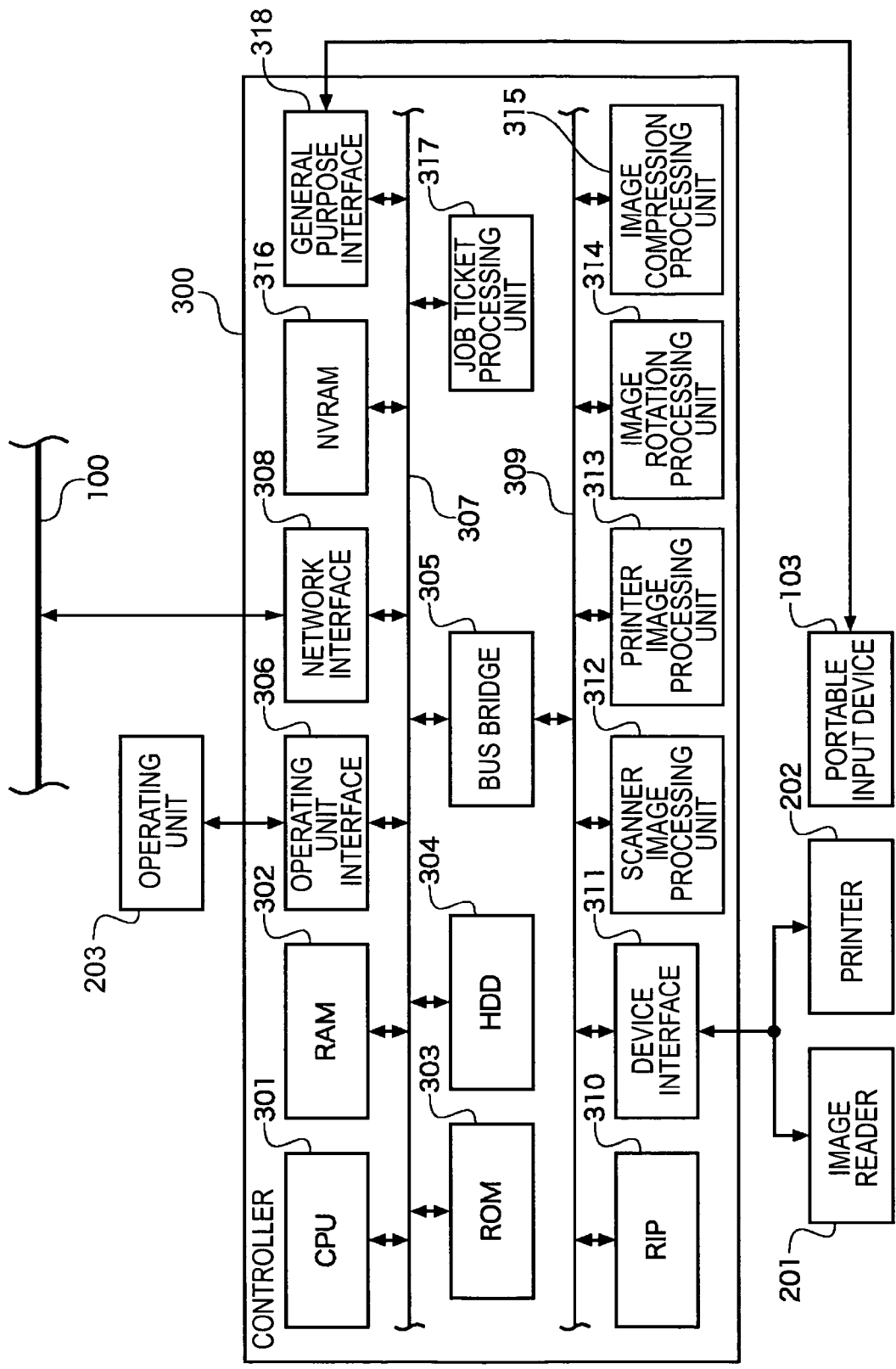
FIG. 3 is a block diagram illustrating a detailed configuration example of a controller of a multifunction printer (MFP).

FIG. 3 is a block diagram illustrating a detailed configuration example of the controller 300 of the MFP 102. As illustrated in FIG. 3, the controller 300 is connected to the image reader 201 or the printer 202 via a device interface 311, to the operating unit 203 via an operating unit interface 306, and to a LAN 100 via a network interface 308. Accordingly, the controller 300 can input and output printing information, image information, device information, and job ticket information which will be described later, with the computer 101 connected to the LAN 100.

A central processing unit (CPU) 301 uses random access memory (RAM) 302 as a work area, and controls the MFP 102 via a system bus 307, according to a control program stored in read-only memory (ROM) 303 or a hard disk drive (HDD) 304. The RAM 302 is used as a work area for the CPU 301, and also is used as memory for temporarily storing image data and so forth. The HDD 304 stores system software, programs for processing to be described later, image data, and so forth. Non-volatile memory (NVRAM) 316 stores the user setting information which is input from the operating unit 203 into the CPU 301 via an operating unit interface 306.

A job ticket processing unit 317 analyzes or sets the description of a job ticket (printing instruction information) which is attached to the image data. The job ticket processing unit 317 can be implemented using various configurations, e.g., independent hardware or software executed by the CPU 301, etc.

A general purpose interface 318 performs data communication with the portable input device 103, and is a serial bus interface such as USB (Universal Serial Bus) or IEEE 1394, for example. Also, this can be an infrared communication interface, or a wireless communication such as Bluetooth, and can be an interface for performing data communication with devices such as the portable input device 103.

A bus bridge 305 bridges the system bus 307 and an image bus 309 which transfers image data at high speed, and converts data formats between both buses. The image bus 309 is a PCI (Peripheral Component Interconnect) bus or a serial bus such as IEEE 1394.

A raster image processor (RIP) 310 interprets printing information described in a page description language (hereinafter referred to as "PDL code") received from the network 100, and performs rendering in a drawing bitmap image and an attribute bitmap image. The device interface 311 is connected to the controller of the image reader 201 and the printer 202 which are the image input/output devices, and performs synchronous/asynchronous conversion of the image data.

A scanner image processing unit 312 performs processing such as filtering processing, color space conversion and editing processing as needed, to the image data input from the image reader 201. A printer image processing unit 313 performs resolution conversion, brightness/density conversion, masking correction, under-color removal (UCR), gamma correction, halftone processing and so forth as needed, to the image data output into the printer 202.

Figure 4:
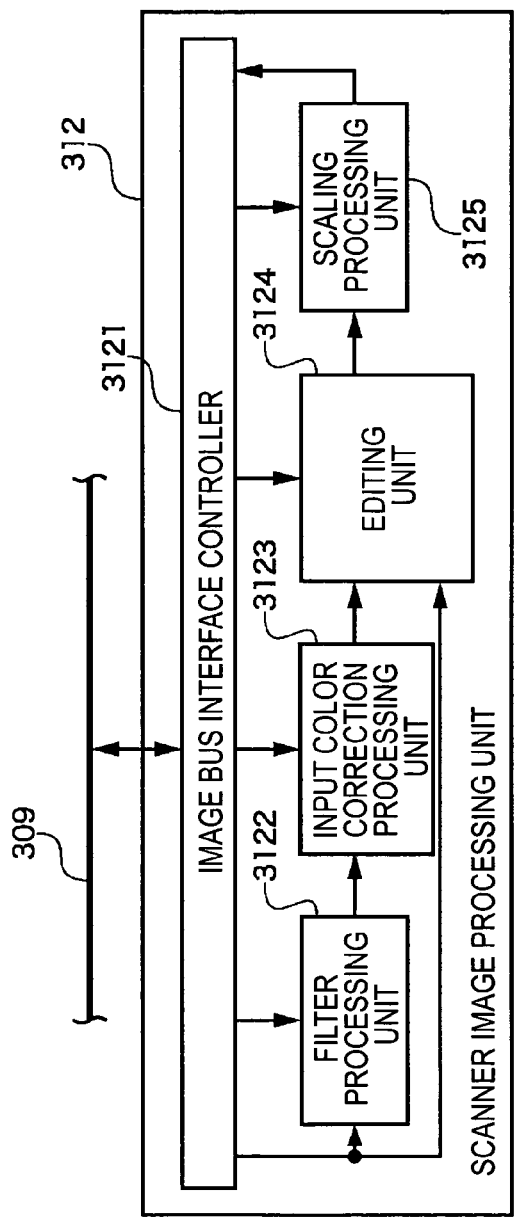
FIG. 4 is a block diagram illustrating a detailed configuration example of a scanner image processing unit.

An image rotation processing unit 314 performs rotation of the image. An image compression processing unit 315 performs compression/decompression processing for multi-value image data with a JPEG (Joint Photographic image coding Experts Group) method. Also, the image compression/decompression processing unit 315 performs compression/decompression processing using a JBIG (Joint Bi-level Image Group) method, an MMR (Modified Modified READ), or an MH (Modified Huffman), for binary image data. Scanner Image Processing Unit FIG. 4 is a block diagram illustrating a detailed configuration example of the scanner image processing unit 312. In FIG. 4, an image bus interface controller 3121 is connected to the image bus 309, and controls the bus access sequence, and also generates a timing signal to be supplied to the various units for the purpose of controlling the various units within the scanner image processing unit 312 and transferring image data.

The filter processing unit 3122 is a spatial filter for performing convolution computation. The input color correction processing unit 3123 is a three-dimensional lookup table (3DLUT) which converts the color space of the image data input from the filter processing unit 3122 into an appropriate color space.

An editing unit 3124 recognizes the closed region enclosed with a marker pen from the input image data, for example, according to the instructions input from the CPU 301 via the image bus interface controller 3121, and performs processing such as shading, hatching, and negative/positive reversal of the image data within this closed region.

Figure 5:
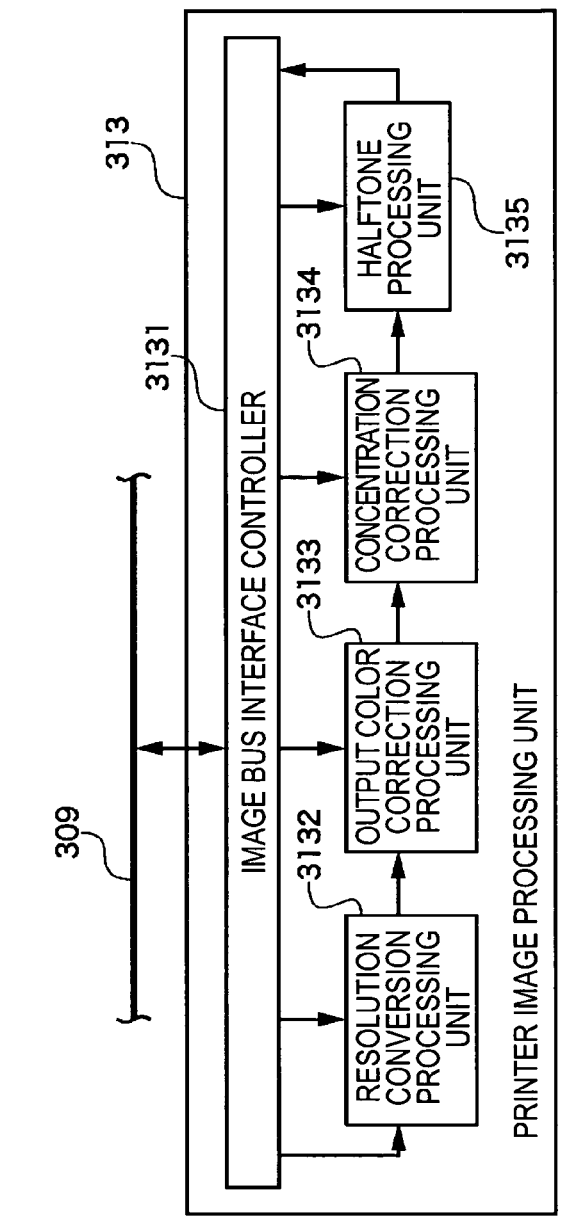
FIG. 5 is a block diagram illustrating a detailed configuration example of a printer image processing unit.

A scaling processing unit 3125, performs enlarging processing by interpolating in the primary scanning direction of the raster image, and performs reduction processing by thinning out processing, according to the instructions input from the CPU 301 via the image bus interface controller 3121. As a result, the resolution (image size) in the primary scanning direction of the input image data is converted. Scaling in the secondary scanning direction is performed by changing the scanning speed of a line sensor (not shown) which reads the image with the image reader 201.
Printer Image Processing Unit FIG. 5 is a block diagram illustrating a detailed example of the printer image processing unit 313. In FIG. 5, an image bus interface controller 3131 is connected to the image bus 309, and controls the bus access sequence, and also generates a timing signal to be supplied to the various units for the purpose of controlling the various units within the printer image processing unit 313 and transferring image data.

A resolution conversion processing unit 3132 converts the image data input from the image reader 201 or via the network interface 308 to the recording resolution of the printer 202.

An output color correction processing unit 3133 converts the image data output from the resolution conversion processing unit 3132 into CMYK (Cyan-Magenta-Yellow-Key/black) data for the printer 202, by using interpolation processing which uses a 3D LUT matching the characteristics of the printer engine of the printer 202.

A density correction processing unit 3134 subjects the image data output from the output color correction processing unit 3133 to gamma correction for linearization of recording density characteristics, using a density correction table matching the density reproduction characteristics of the printer engine of the printer 202.

A halftone processing unit 3135 converts the multi-value image data output from the density correction processing unit 3134 into image data with a predetermined number of tones, using an error diffusion processing or a screen processing.

Figure 6:
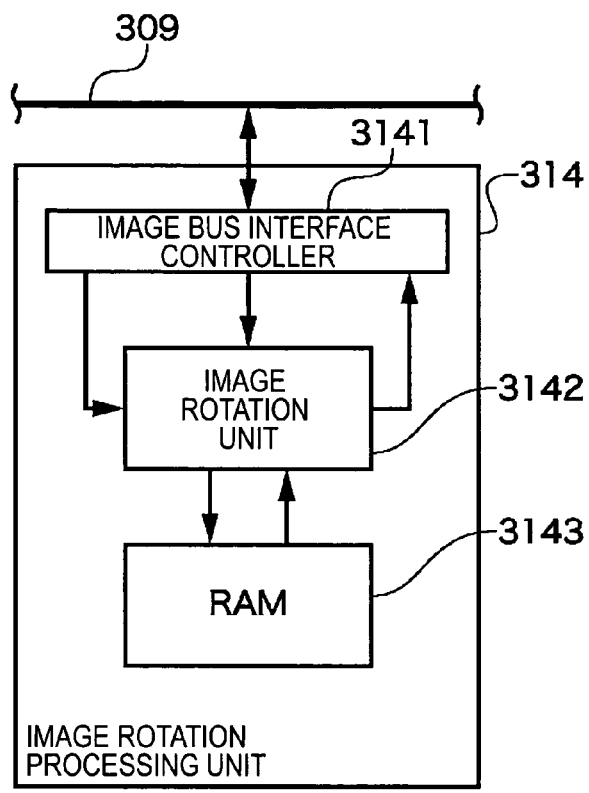
FIG. 6 is a block diagram illustrating a detailed configuration example of an image rotation processing unit.

The output color correction processing unit 3133, the density correction processing unit 3134, and the halftone processing unit 3135 each maintain multiple processing parameters, and select the processing parameters according to an attribute bitmap image output by the RIP 310. The printer image processing is performed using the selected processing parameters thereof.
Image Rotation Processing Unit FIG. 6 is a block diagram illustrating a detailed configuration example of an image rotation processing unit 314. In FIG. 6, an image bus interface controller 3141 is connected to the image bus 309, and controls the bus access sequence, and also generates a timing signal to be supplied to the various units for the purpose of controlling the various units within the image rotation processing unit 314 and transferring image data.

The image rotation unit 3142 performs rotation processing of the image using a RAM 3143, according to the instructions (including rotation direction and angle of the image) which are input from the CPU 301 via the image bus interface controller 3141.
Image Compression Processing Unit FIG. 7 is a block diagram illustrating a detailed configuration example of an image compression processing unit 315.

Figure 7:
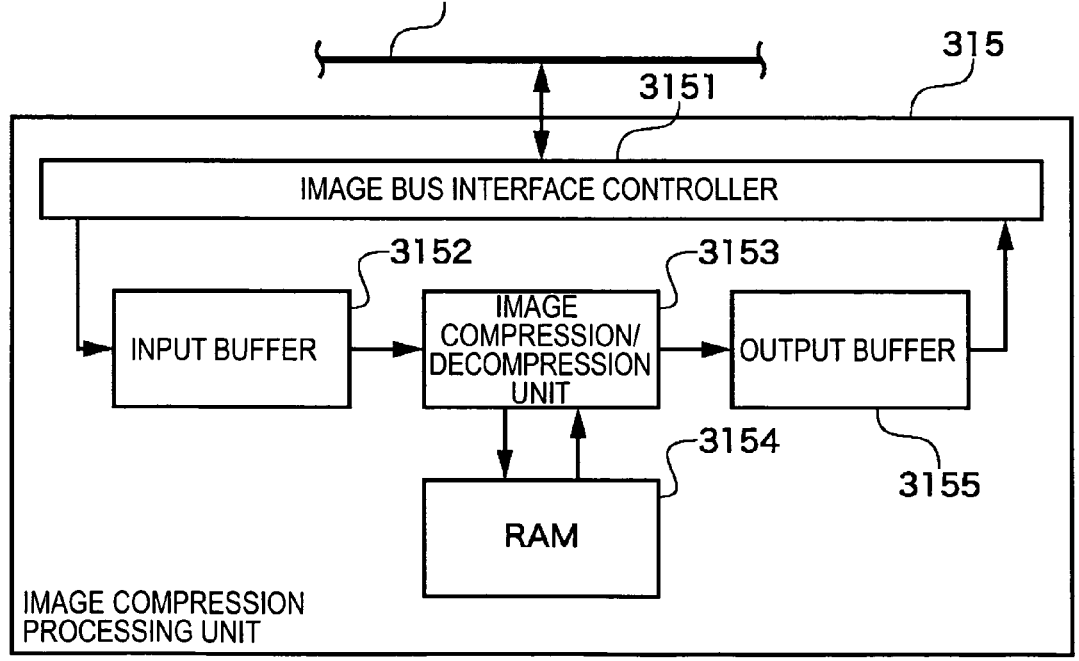
FIG. 7 is a block diagram illustrating a detailed configuration example of an image compression processing unit.

In FIG. 7, an image bus interface controller 3151 is connected to the image bus 309, and controls the bus access sequence, and also generates a timing signal to be supplied to the various units for the purpose of controlling the various units within the image compression processing unit 315 and transferring image data.

The image bus interface controller 3151 also performs timing control for performing data exchange between an input buffer 3152 and an output buffer 3155, and control for mode setting as to the image compression unit 3153.

An image compression/decompression unit 3153 compresses or decompresses the image data which is buffered by the input buffer 3152, using a RAM 3154, according to the instructions (including instructions for compression or decompression, and compression methods) which are input from the CPU 301 via the image bus interface controller 3141. Subsequently, image data obtained as the results of compression or decompression is written to the output buffer 3155.

Computer Configuration

Figure 8:
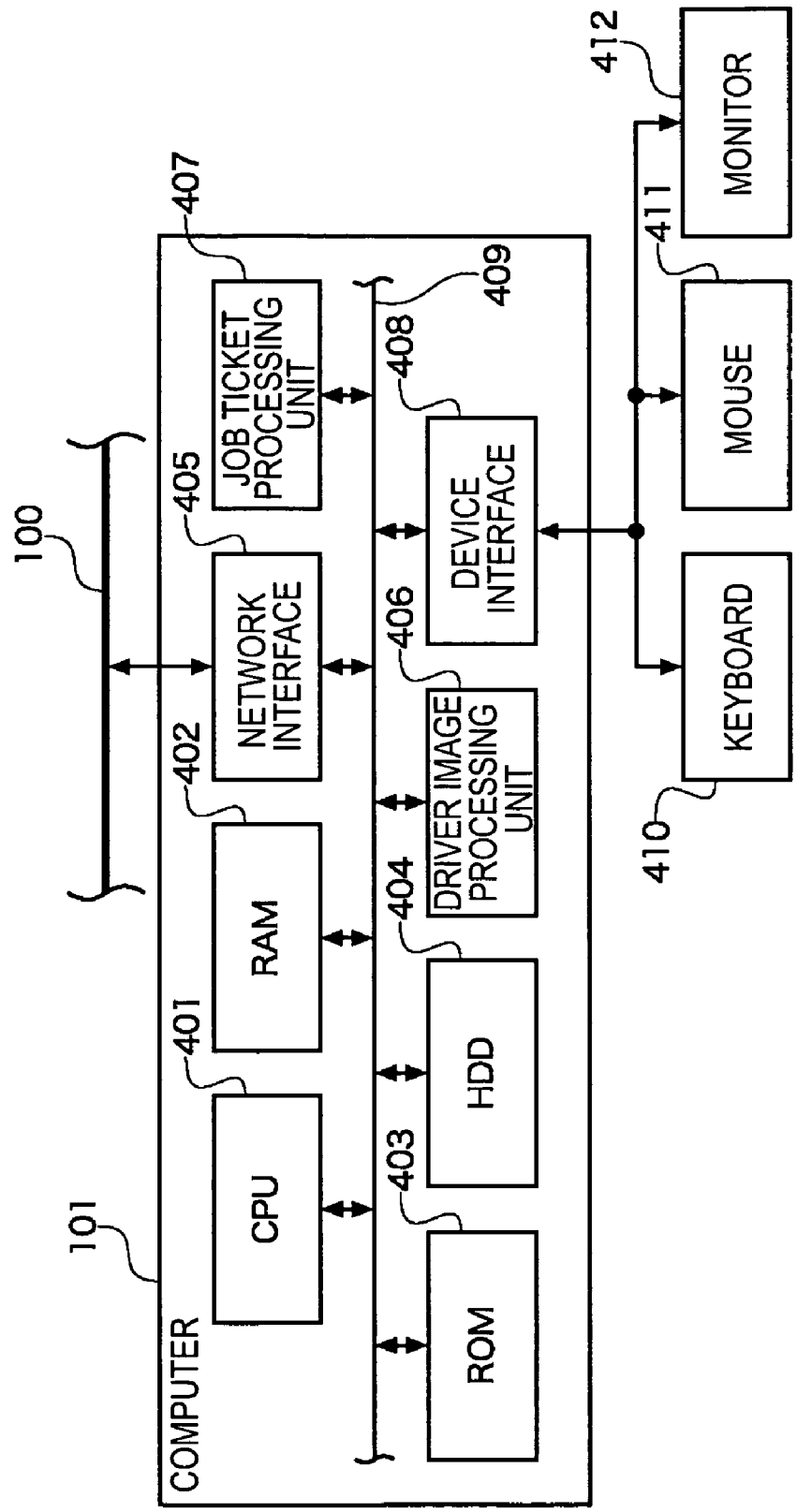
FIG. 8 is a block diagram illustrating a detailed configuration example of a host computer.

FIG. 8 is a block diagram illustrating a configuration example of a host computer 101. In FIG. 8, the computer 101 provides a user interface. This computer 101 is connected to a keyboard 410, a mouse 411, and a monitor 412 via a device interface 408, for inputting instructions from the user. The computer 101 is connected to the LAN 100 via a network interface 405. Accordingly, the computer 101 can communicate with the MFP 102 connected to the LAN 100 in order to input and output printing information, image information, device information, job ticket information and so forth.

A CPU 401 uses a RAM 402 as a work area, and executes a basic input/output system (BIOS) stored in a ROM 403 or an operating system (OS) stored in an HDD 404. Also, the CPU 401 controls the computer 101 via a system bus 409, and also executes various software which is stored in the HDD 404. As a result, the CPU 401 performs processing on the various types of data temporarily stored in the RAM 402 or the various types of data stored in the HDD 404.

A driver image processing unit 406 performs correction on the input image data (to be described later), and the job ticket processing unit 407 analyzes or sets the descriptions such as the printing instruction information attached to the image data (which will be described later). The driver image processing unit 406 and a job ticket processing unit 407 can be configured in various ways, for example, as independent hardware or by software executed by the CPU 401.

Portable Input Device

Figure 9:
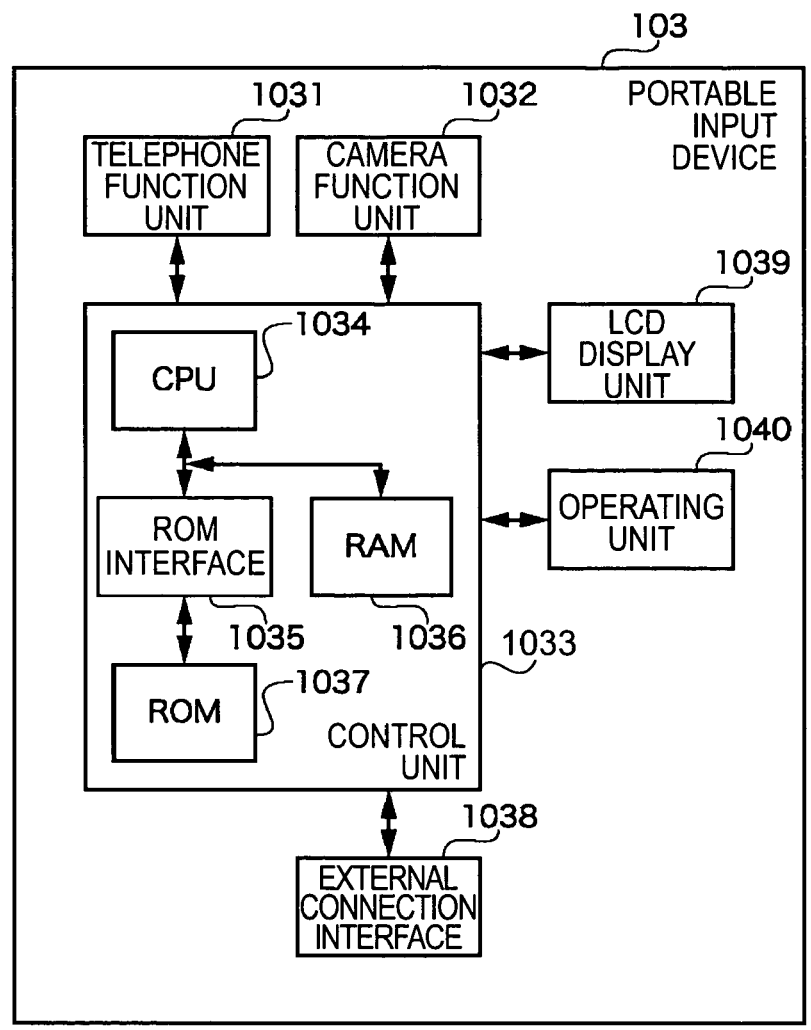
FIG. 9 is a block diagram illustrating a detailed configuration example of a portable input device.

FIG. 9 is a block diagram illustrating a detailed configuration example of a portable input device 103. The portable input device 103 includes a liquid crystal display (LCD) display unit 1039 (hereinafter referred to as "LCD display unit"), as with a portable telephone or a digital camera, and an operating unit 1040 that has operating keys such as a numeric keypad. The exemplary portable input device shown in FIG. 9 also includes a telephone function unit 1031 for functioning as a wireless telephone and a camera function unit 1032 for functioning as a digital camera.

The exemplary portable input device shown in FIG. 9 also includes a control unit 1033 which has a CPU 1034, a ROM interface 1035, a RAM 1036 and a ROM 1037. The CPU 1034 controls the input device 103. The CPU 1034 may be, for example, a one-chip microprocessor. The RAM 1036 is used for temporarily storing images which are photographed by the camera function unit 1032 and the work area of the CPU 1034. The ROM 1037 stores information as a portable telephone (such as a telephone number, authentication information, password and so forth for the device itself), and color property information as a digital camera, and is connected to the CPU 1034 via the ROM interface 1035. The RAM 1036 and the ROM 1037 are attached to the portable input device 103 so as to be detachable as necessary.

The portable input device 103 also includes an external expansion interface (hereinafter referred to as "external connection interface") 1038. For example, wireless data communication with other devices can be performed by attaching a wireless interface card such as infrared communication or Bluetooth onto the external connection interface 1038. If the external connection interface 1038 is a serial bus USB (Universal Serial Bus) or IEEE 1394 which are general purpose interfaces, this is not limited to wireless data communication, and wired data communication can also be performed with other devices. With the present exemplary embodiment, the external expansion interface 1038 of the portable input device 103 and the general purpose interface 318 of the MFP 102 are connected by cable, or by infrared or other wireless means, and data communication is performed. Also, a removable storage medium, such as an IC (integrated circuit) card or a USB memory can be connected to the external expansion interface 1038. As a result, the information as a portable telephone or the information registered by the user (such as the telephone number of the other communication party) can be stored in not only the RAM 1036 or the ROM 1037 but also in the removable storage medium.

Procedures for Direct Printing Based on User Instructions

Figure 11:
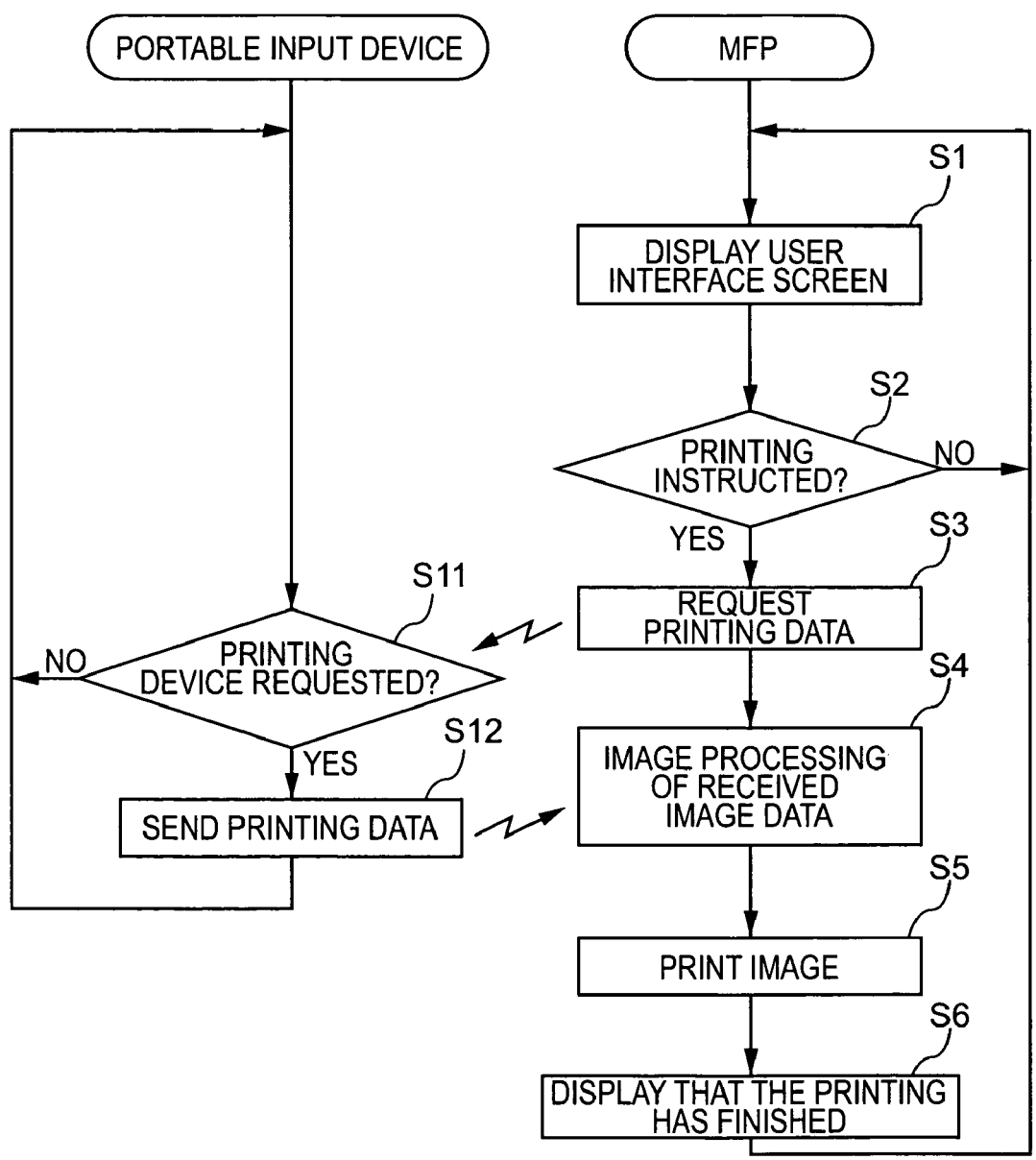
FIG. 11 is a flowchart illustrating a process for direct printing using a portable input device and an MFP.

FIG. 11 is a flowchart illustrating processing for direct printing with a portable input device 103 and an MFP 102. When the user connects the MFP 102 and the portable input device 103 by cable, or by infrared or other wireless connection, the CPU 1034 of the portable input device 103 executes the control program which is stored in the ROM 1037. The CPU 301 of the MFP 102 then executes a control program which is stored in the ROM 303 and/or the HDD 304, thus realizing the features of the present invention.

In the following description, processing under the control of the CPU 301 of the MFP 102 and of the CPU 1034 of the portable input device 103 will be described, for the sake of simplification.

When the MFP 102 and the portable input device 103 are connected, the MFP 102 displays a user interface screen for the purpose of printing (Step Si). The display of the user interface screen can be one or the other of the operating unit 203 or the LCD display unit 1039.

In Step S2, it is determined whether printing has been instructed at the MFP 102. When the user operates the user interface screen of the MFP 102 and instructs printing (yes in Step S2), the MFP 102 requests printing data from the portable input device 103 (Step S3).

When the portable input device 103 receives a request for printing data (Step S11), the portable input device 103 sends image data including a job ticket as the printing data to the MFP 102 (Step S12), and returns the process to Step S11.

Figure 12:
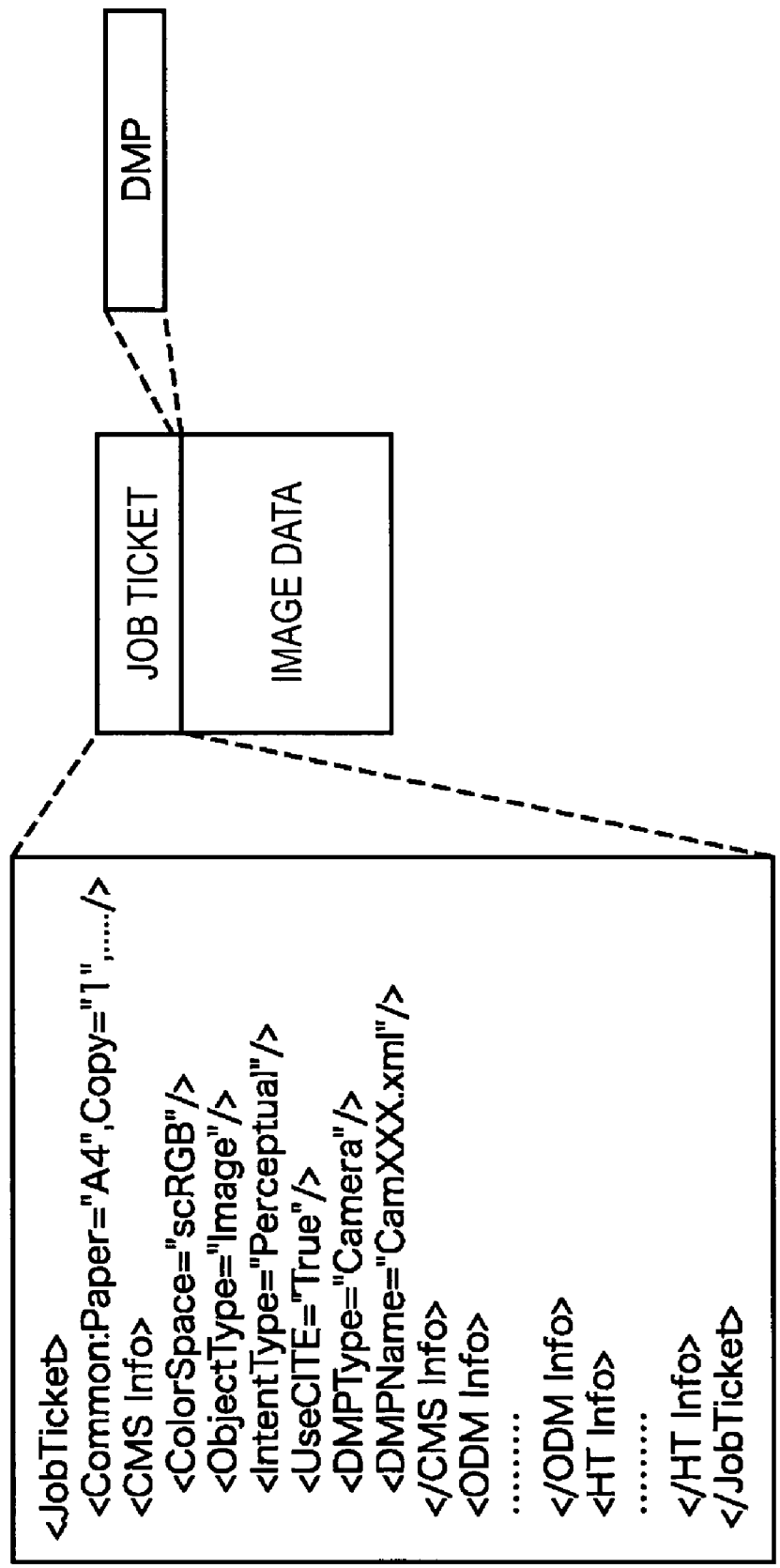
FIG. 12 is a diagram illustrating a configuration example of a job ticket.

FIG. 12 is a diagram illustrating a configuration example of a job ticket, and the tag configuration has a basic setting portion and an image processing setting portion, each of which are described as specific keywords. The job ticket can be attached to the image data.

The MFP 102 which has received the printing data performs image processing of the image data including the job ticket (Step S4), controls the printer 202, and prints the image based on the image data according to the print data on which image processing has been performed (Step S5). When the printing is finished, the fact that printing has finished is displayed on the user interface screen (Step S6), and the MFP 102 returns the process to Step S1.

The above processing is repeated until the connection between the MFP 102 and the portable input device 103 is terminated.

Image Processing of Received Image Data (Step S4)

Figure 13:
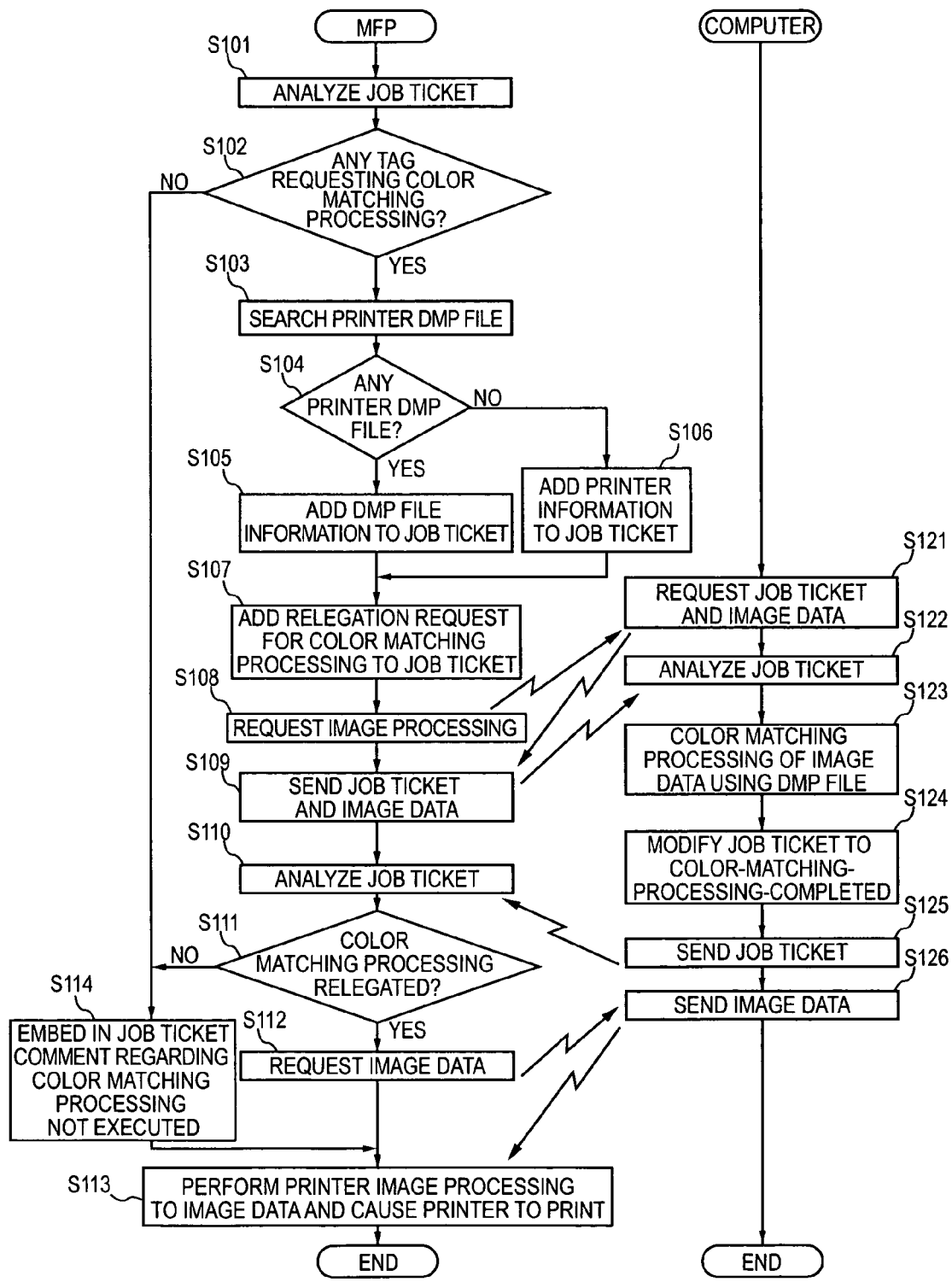
FIG. 13 is a flowchart illustrating details of image processing of image data which includes a job ticket.

FIG. 13 is a flowchart illustrating details of the image processing (Step S4) of the image data including the job ticket. The CPU 401 of the computer 101 then executes a control program which is stored in the HDD 404, and the CPU 301 of the MFP 102 executes a control program which is stored in the ROM 303 and/or the HDD 304, thus realizing the features of the present invention. In the following description, processing under the control of the CPU 301 of the MFP 102 and the CPU 401 of the computer 101 will be described, for the sake of simplification.

The MFP 102 analyzes the received job ticket (Step S101) with the job ticket processing unit 317. The MFP 102 determines whether or not there is a tag (<UseCITE="True"/>) requesting color-matching processing within the analyzed job ticket (Step S102). In the event that there is not a request for color-matching processing (no in Step S102), the flow advances to Step S114. ON the other hand, in the event that there is a request for color-matching processing (yes in Step S102), a search is performed on the HDD 304 for a DMP (Device Model Profile) file describing the measurement values of the printer 202 (Step S103), and a determination is made as to whether or not there is a DMP file (Step S104). The measurement values are as described in the Related Art.

In the event that there is a DMP file of the printer 202 (yes in Step S104) the MFP 102 adds printer DMP file information within the CMS Info tag of the job ticket with the job ticket processing unit 317, as illustrated in FIG. 14 (S105). This description is, for example, <DMPType="Printer"/> <DMPName="PrnXXX.xml"/>. Then the DMP file is attached to the job ticket. In the event that there is not a DMP file for the printer 202 (no in Step S104), the job ticket processing unit 317 attaches a description illustrating printer information within the CMS Info tag of the job ticket, as illustrated in FIG. 15 (Step S106). This description is, for example, <DeviceType="Printer"/> <Device Name="PrnXXX"/>.

After adding DMP file information to the job ticket (Step S105) or adding printer information to the job ticket (Step S106), the MFP 102 changes the UseCITE tag of the job ticket to <UseCITE="Host"/> with the job ticket processing unit 317, as illustrated in FIG. 16, in order to relegate the color-matching processing to the computer 101 (Step S107). Then, image processing is requested of the computer 101 (Step S108). For example the image processing is requested of a computer 101 which has CTE installed as an operating system.

The computer 101 which has received the request for image processing from the MFP 102 establishes a connection with the MFP 102, and requests a job ticket and image data from the MFP 102 (Step S121). The MFP 102 which has received this request sends a job ticket and the image data to the computer 101 (Step S109).

The computer 101 which has received the job ticket and the image data analyzes the job ticket with the job ticket processing unit 407 (Step S122). Then according to the analysis result thereof, the computer 101 performs color-matching processing on the received image data using the DMP file, with the driver image processing unit 406 (Step S123), the details of which will be described later. Next, the UseCITE tag of the job ticket is changed to color-matching with processing completed status (<UseCITE="Complete"/>) (Step S124) using the job ticket processing unit 407, and sends the job ticket to the MFP 102 (Step S125).

The MFP 102 which has received the job ticket analyzes the job ticket with the job ticket processing unit 317 (Step S110). Then the MFP 102 determines whether or not the color-matching processing is relegated (Step S111). In the event it has been relegated (yes in Step S111), the computer 101 is requested to send the image data after image processing (Step S112). The computer 101 which has received a sending request for the image data sends this image data to the MFP 102 (Step S126). The MFP 102 which has received the image data controls the printer image processing unit 313 and performs printer image processing on the received image data, according to the job ticket, and causes the printer 202 to print the image (Step S113), and finishes the process.

Determination is made as to whether the color-matching processing is relegated (<UseCITE="Disable"/>), and whether there has been a request for color-matching processing (no UseCITE tag in the job ticket, or <UseCITE="false"/) (Step S111).

If color matching has not been relegated (no in Step S111), the MFP 102 embeds a comment in the job ticket to indicate that the color-matching processing has not been executed by the job ticket processing unit 317 (Step S114), and advances the process to Step S113.

In the event that color-matching processing is not relegated in Step Sill, if there is an ICC profile for the portable input device 103 and the MFP 102, the CPU 301 of the controller 300 can perform color-matching processing using this ICC profile.

Relegated Processing by Computer (Step S123)

Figure 17:
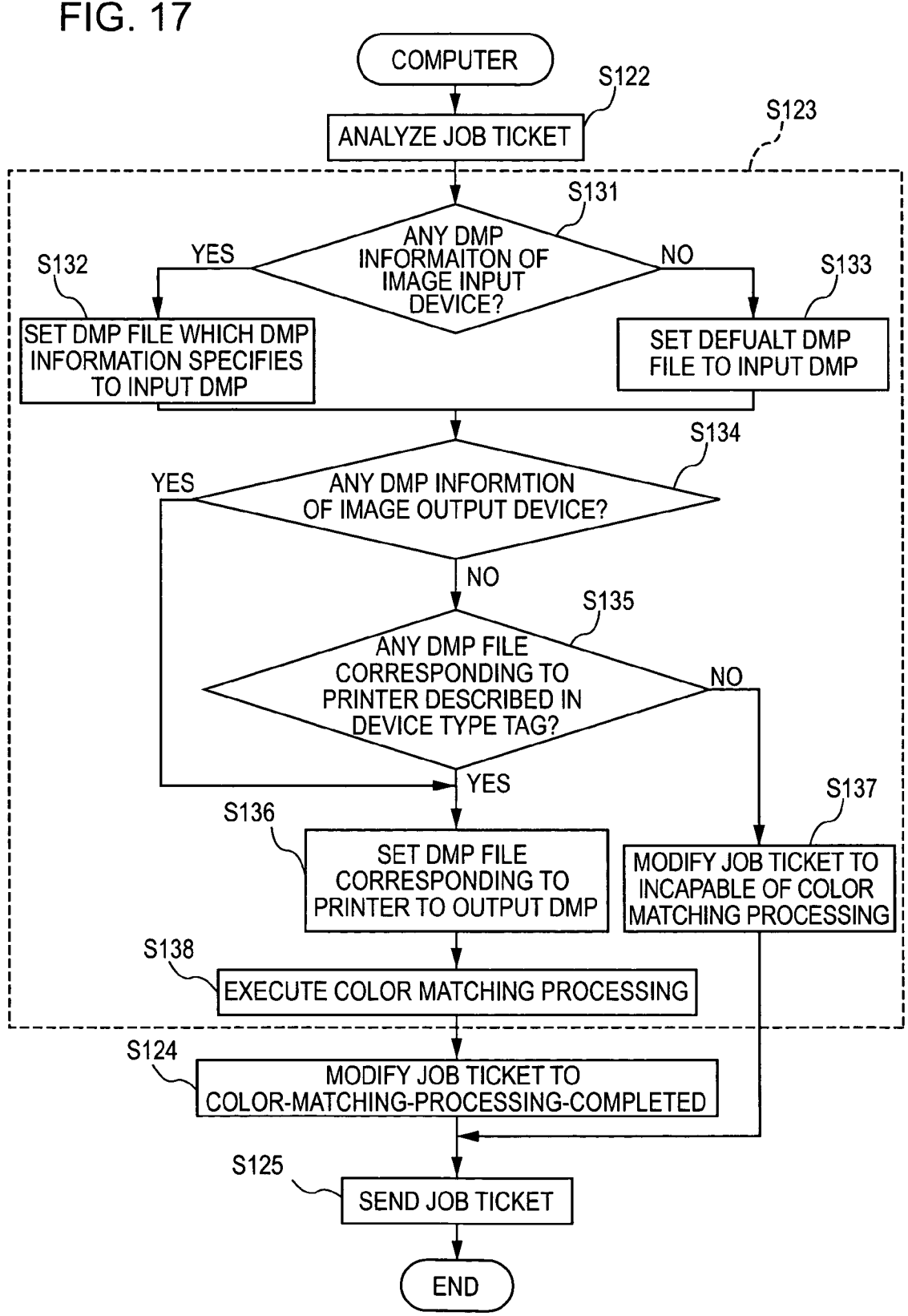
FIG. 17 is a flowchart showing details of relegated processing with a computer.

FIG. 17 is a flowchart illustrating the details of the relegation process (Step S123) performed by the computer 101. The CPU 401 of the computer 101 executes a control program which is stored in the HDD 404, thus realizing the features of the present invention. The following processing is performed under the control of the CPU 401 of the computer 101.

The computer 101 analyzes the received job ticket with the job ticket processing unit 407 (Step S122 in FIG. 13), and determines whether or not there is any DMP information describing the measurement values of the image input device within the CMS Info tag of the job ticket (Step S131). From the results of the determination, if there is DMP information (yes in Step S131), a DMP file specified by this DMP information is set in the input DMP (Step S132), and if there is no DMP information (no in Step S131), a default DMP file set in the computer 101 is set in the input DMP (Step S133).

FIG. 18 is a diagram illustrating one example of a job ticket in the case that there is no DMP information for the image input device and thus of setting a default input DMP (monitor DMP in FIG. 18), which was set in the computer 101. Specifically, the description <DMPType="Monitor"/> <DMPName="MonXXX.xml"/> applies.

Next, the computer 101 determines whether or not there is any DMP information for the image output device within the CMS Info tag of the job ticket (Step S134). From the results of the determination, if there is no DMP information for the image output device (no in Step S134), determination is made as to whether or not there is a DMP file corresponding to the printer described in the DeviceType tag within the CMS Info tag of the job ticket in the HDD 404 (or in the server on the network 100) (Step S135).

From the results of this reading, in the event that there is DMP information in the job ticket (yes in Step S134), or in the event there is a DMP file corresponding to the printer described in the Device type tag (yes in Step S135), the corresponding DMP file is set as the output DMP (Step S136). On the other hand, in the event there is no DMP information (no in Step S134), nor a DMP file corresponding to the printer (no in Step S135), the UseCITE tag of the job ticket is changed to color-matching disabled, shown by <UseCITE="Disable"/> with the job ticket processing unit 407 (Step S137). The changed job ticket is sent to the MFP 102 (Step S125 in FIG. 13).

Figure 10:
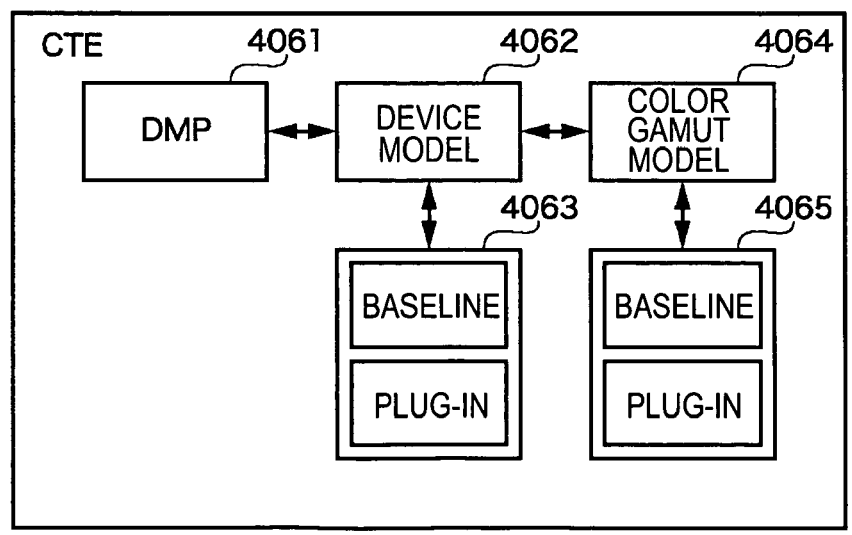
FIG. 10 illustrates color matching processing using DMP.

After setting the output DMP, the computer 101 executes color-matching processing on the image data which is received by the driver image processing unit 406, according to the description in the CMS Info tag on the job ticket (Step S138). To use the job ticket illustrated in FIG. 14 as an example, a Perceptual mapping algorithm is selected from the color gamut model (4064 of FIG. 10) based on <IntentType="Perceptual"/>, and color-matching processing is performed.

Next, the computer 101 changes the UseCITE tag of the job ticket to <UseCITE="Complete"/> with the job ticket processing unit 407 (Step S124 in FIG. 13), and sends the job ticket to the MFP 102 (Step S125 in FIG. 13).

In the event that there is DMP information, setting the input (or output) DMP as the DMP file specified by this DMP information refers to removing the DMP file specified with a DMPName tag from the job ticket (see FIG. 12) and setting it.

Thus, when performing direct printing by using an MFP 102 and a portable input device 103 having a camera function such as a portable telephone or a digital camera, a configuration is used in which the color processing information is described on the job ticket in XML. As a result, the input DMP and output DMP are set, and color-matching processing can be relegated to a computer 101 which is capable of executing color-matching processing with CTE, for example.

In the event that no input DMP is specified in the job ticket, it can be relegated to the default input DMP of the computer 101. Further, in the event that no output DMP is specified in the job ticket, a DMP file corresponding to the printer information described in the DeviceType tag can be looked up from the computer 101 or the server, and color-matching processing can be executed. Thus, direct printing can be provided which takes into consideration the color-matching processing based on the profile describing the input/output color characteristics of the image input/output device. Also, relegation processing can be performed for color-matching processing based on the profile describing the input/output color characteristics of the image input/output device.

Modifications

In the above descriptions, an example has been given wherein, in the case of performing direct printing using the portable input device 103 or the MFP 102, if there is a tag for performing color-matching processing, the computer is requested to perform color-matching processing using DMP. However, the user can be queried as to whether or not color-matching processing using DMP will be performed.

Figure 19:
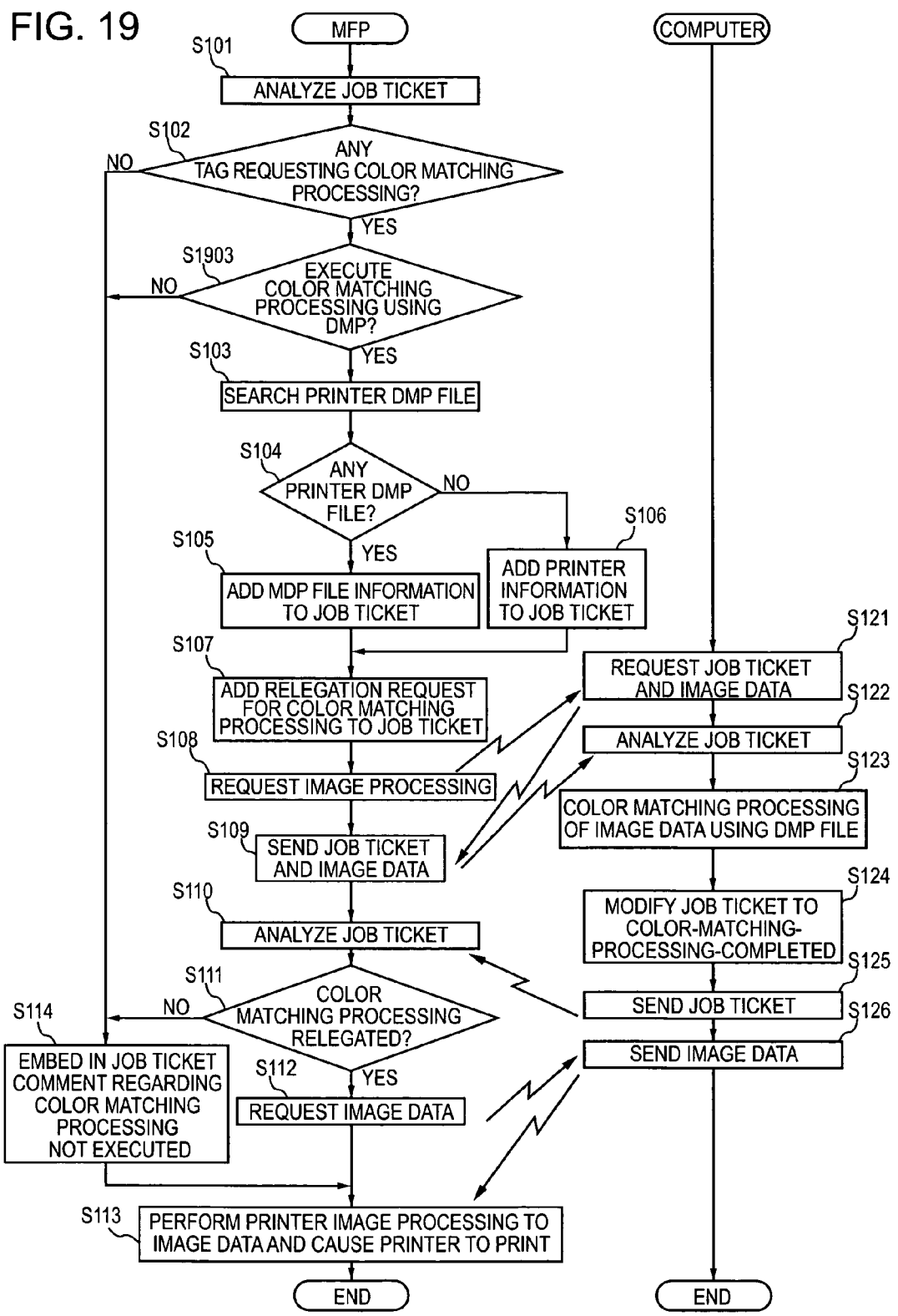
FIG. 19 is a flowchart illustrating a modification example of image processing of image data including a job ticket.

FIG. 19 is a flowchart illustrating a modified example of the image processing (Step S4) of the image data including the received job ticket illustrated in FIG. 13. The point differing from the process illustrated in FIG. 13 is the point in which the user is queried (Step S1903) via the operating unit 203 as to whether or not color-matching processing using DMP will be performed. In the event that the instruction via the operating unit 203 is to perform color-matching, the process branches to Step S103 and performs the same process as described using FIG. 13. In the event that the instruction via the operating unit 203 is to not perform color-matching, the process branches to Step S114 and color-matching processing is not executed.

Figure 20:
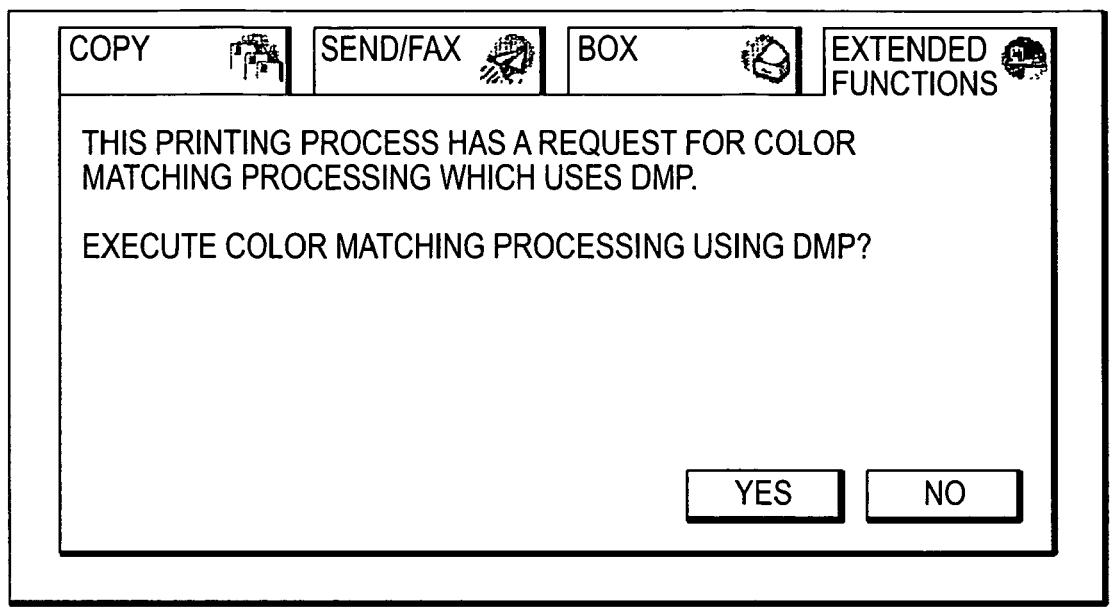
FIG. 20 is a diagram illustrating one example of a user interface for querying a user as to whether or not color matching processing is to be performed.

FIG. 20 is a diagram illustrating one example of a user interface for the purpose of querying the user as to whether or not color-matching processing is to be performed, which the CPU 301 displays on the operating unit 203 of the MFP 102 in Step S1903. Also, the CPU 301 can instruct the CPU 1034 of the portable input device 103 via the network interface 308, and a screen can be displayed on the LCD display unit 1039 for the user to select whether or not to perform color-matching processing.

In the event that direct printing is performed using the portable input device 103 with an image photographing function such as portable telephone or a digital camera, and an MFP 102, the following can occur. In the event that the color-matching processing using DMP is described in the color setting information of the job ticket in XML description format, such as with CTE, the user can select whether or not to perform color-matching processing. Then only in the case in which the user selects to perform color-matching processing, the input DMP and the output DMP is set, and relegation processing is performed with a computer 101 capable of color-matching processing. Thus, transferring the image data to the computer 101 and having the computer 101 perform color-matching processing even when color-matching processing is not necessary does not happen.

Therefore, unnecessary traffic increase on the network 100 and unnecessary use of the resource of the computer 101 can be prevented.

In the event that the instruction from the user interface in FIG. 20 is not to perform color-matching processing using DMP, if there is an ICC profile for the portable input device 103 and the MFP 102, the CPU 301 can perform color-matching processing using this ICC profile.

Also, in the above descriptions, description has been made as to how the CPU 301 of the MFP 102 selects the computer to request the color-matching processing. The following are available as selection methods. (1) A list of computers (IP addresses thereof) which can be used on the network 100 is registered on the HDD 304 of the MFP 102 in advance, and the CPU 301 references this list and selects a computer to request the color-matching processing. (2) The CPU 301 queries the computers on this list in order of priority, and places the request with the computer from which a response is received that color-matching processing can be performed. (3) The MFP 102 queries the computers on the network 100 which can be requested to perform color-matching processing, and according to the responses thereof, selects a computer which can be requested to perform color-matching processing.

Also, in the above description, an example has been described wherein the MFP 102 and the portable input device 103 are connected via a general-purpose interface 318. For example, if the portable input device 103 corresponds to a wireless network such as IEEE802.11a/b/g, and has a wireless router or a wireless hub corresponding to similar specifications on the LAN 100, the MFP 102 and the portable input device 103 can be connected via the LAN 100.

Other Embodiments

The present invention can be applied to a system including multiple devices (for example, a host computer, an interface device, a reader, a printer, and so forth), or can be applied to an integral device (for example, a photocopier, a facsimile device, and so forth).

Also, an arrangement may be made wherein storage medium (or a recording medium) in which the program code (software) realizing the functions of the above-described embodiments are recorded is supplied to a system or a device, and the above-described embodiments are realized with a configuration wherein the computer (or CPU or MPU (microprocessing unit)) of the system or device reads and executes the program code stored in the storage medium. In this case, the program code itself which is read from the storage medium realizes the functions of the above-described embodiments. Also, this program code and the storage medium storing the program make up the present invention.

Further, an arrangement may be made wherein the program code read from the storage medium is written to memory on a function expansion card inserted into the computer or a function expansion unit connected to the computer, and part or all of the actual processing is: performed by a CPU provided to the function expansion unit or the function expansion card based on the instructions of this program code.

In the event that the above-mentioned storage medium is applied to the present invention, the program code corresponding to the above-described flowcharts is stored in this storage medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-321128 filed Nov. 4, 2004, which is hereby incorporated by reference herein in its entirety.

What is claimed is:

1. An image processing method for an image processing device having a printer and a color matching processing function by using an ICC (International Color Consortium) profile, the image processing method comprising:

analyzing printing instruction information of printing data;

determining whether a request for color matching processing based on a device model profile described in XML (eXtensible Markup Language) format, being different from an ICC profile, describing a correlation between a color value of a color patch, printed by the printer, and a measurement value of the color patch is included in the printing instruction information;

if it is determined that the request for color matching processing by using the device model profile described in XML format is included in the printing instruction information, selecting a computer device on a network, including a color matching processing function using the device model profile, and requesting color matching processing, using the device model profile described in XML format, to the computer device;

sending image data of the print data and the printing instruction information of the print data to the computer device requesting the color matching processing;

receiving and analyzing printing instruction information from the computer device, and determining whether the computer device performed the color matching processing using the device model profile described in XML format;

if it is determined that the computer device performed the color matching processing using the device model profile described in XML format, the computer device is requested to transmit image data to which the color matching processing using the device model profile described in XML format is performed; and receiving image data on which the color matching processing is requested, where the device model profile described in XML format is described in the print instruction information, from the computer device.

2. An image processing method according to claim 1, wherein if it is determined that the request for the color matching processing by using the device model profile is included in the printing instruction information, the image processing method further comprising:

searching a memory of the image processing device;

looking up the device model profile describing the output color characteristics of the image processing device having the printer; and correcting the printing instruction information based on a result of the search.

3. An image processing method according to claim 1, wherein if it is determined that the request for color matching processing by using the device model profile is included, further comprising:

querying a user as to whether the color matching processing by using the device model profile will be performed.

4. A non-transitory computer-readable medium having stored thereon computer-executable instruction for processing images of printing data input from a computer device and an image input device via a predetermined communications line or a network according to the method of claim 1.

5. An image processing device having a color matching processing function by using an ICC (International Color Consortium) profile, the image processing device comprising:

a printer;

an analyzer configured to analyze printing instruction information of printing data, and to determine whether a request for color matching processing based on a device model profile described in XML (eXtensible Markup Language) format, being different from an ICC profile, describing a correlation between a color value of a color patch, printed by the printer, and a measurement value of the color patch is included in the printing instruction information; and a requester configured to request color matching processing to a computer device on a network, including a color matching processing function using the device model profile described in XML format in a case that a request for the color matching processing by using the device model profile described in XML format is included in the printing instruction information; and a receiver configured to receive and analyze printing instruction information from the computer device, to determine whether the computer device performed the color matching processing using the device model profile described in XML format, to request the computer device to transmit image data to which the color matching processing using the device model described in XML format is performed, in a case that the computer device performed the color matching processing using the device model profile described in XML format, and to receive image data on which the color matching processing is requested, where the device model profile described in XML format is described in the print instruction information, from the computer device.

* * * * *